US012804440B2

(12) United States Patent
Chi

(10) Patent No.: US 12,804,440 B2
(45) Date of Patent: Nov. 17, 2026

(54) INTERFERENCE MEASUREMENT METHOD AND APPARATUS THEREOF

(71) Applicant: Beijing Xiaomi Mobile Software Co., Ltd., Beijing (CN)

(72) Inventor: Liangang Chi, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 306 days.

(21) Appl. No.: 18/570,863

(22) PCT Filed: Jun. 18, 2021

(86) PCT No.: PCT/CN2021/100895
§ 371 (c)(1),
(2) Date: Dec. 15, 2023

(87) PCT Pub. No.: WO2022/261937
PCT Pub. Date: Dec. 22, 2022

(65) Prior Publication Data

US 2024/0292256 A1 Aug. 29, 2024

(51) Int. Cl.
*H04W 24/10* (2009.01)
*H04B 17/309* (2015.01)
(Continued)

(52) U.S. Cl.
CPC .......... *H04W 24/10* (2013.01); *H04B 17/328* (2023.05); *H04B 17/346* (2023.05); *H04L 1/0026* (2013.01); *H04W 72/23* (2023.01)

(58) Field of Classification Search
CPC .... H04W 24/10; H04W 72/23; H04B 17/328; H04B 17/346; H04L 1/0026
See application file for complete search history.

(56) References Cited

U.S. PATENT DOCUMENTS 10,644,845 B2 * 5/2020 Yang .................... H04L 5/0053
2016/0174091 A1 * 6/2016 Zhang ............... H04W 36/0094
370/252
(Continued)

FOREIGN PATENT DOCUMENTS

CN 109219970 A 1/2019
CN 110249686 A 9/2019
(Continued)

OTHER PUBLICATIONS

ISA State Intellectual Property Office of the People's Republic of China, International Search Report Issued in Application No. PCT/CN2021/100895, Dec. 1, 2021, WIPO, 6 pages.
(Continued)

*Primary Examiner* — Michael J Moore, Jr.
(74) *Attorney, Agent, or Firm* — Volpe Koenig

(57) ABSTRACT

An interference measurement method and apparatus, relating to the technical field of communication, where the interference measurement method is performed by a first terminal device, and the interference measurement method includes: receiving a measurement signal by using a receiving beam in a physical downlink shared channel (PDSCH) of the first terminal device; and determining an interference measurement result of the measurement signal. According to the method, based on the measurement signal received through the receiving beam on the PDSCH of the first terminal device, the interference measurement result of the measurement signal can be determined, so that the first terminal device can determine other terminal devices having strong mutual interference to the first terminal device.

17 Claims, 6 Drawing Sheets

(51) Int. Cl.

| | |
|---|---|
| ***H04B 17/318*** | (2015.01) |
| ***H04L 1/00*** | (2006.01) |
| ***H04W 72/23*** | (2023.01) |

(56) References Cited

U.S. PATENT DOCUMENTS

| | | | | |
|---|---|---|---|---|
| 2018/0323916 | A1* | 11/2018 | Yang | H04L 5/0053 |
| 2020/0351690 | A1* | 11/2020 | Zhu | H04B 17/318 |
| 2021/0006997 | A1* | 1/2021 | Jin | H04B 17/382 |
| 2022/0095240 | A1* | 3/2022 | Ying | H04L 5/005 |
| 2022/0116129 | A1* | 4/2022 | Ying | H04B 7/063 |
| 2023/0188229 | A1* | 6/2023 | Xu | H04W 56/0015 370/329 |
| 2023/0319605 | A1* | 10/2023 | Park | H04L 5/00 370/252 |
| 2024/0292256 | A1* | 8/2024 | Chi | H04L 1/0026 |

FOREIGN PATENT DOCUMENTS

| | | | | |
|---|---|---|---|---|
| CN | 111510946 | A | 8/2020 | |
| CN | 111988099 | A | 11/2020 | |
| CN | 112867031 | A | 5/2021 | |
| WO | WO-2024161364 | A1 * | 8/2024 | H04L 5/0048 |
| WO | WO-2025038206 | A1 * | 2/2025 | H04L 5/0051 |

OTHER PUBLICATIONS

Huawei etc. "UE-to-UE measurement for cross-link interference mitigation""3GPP TSG RAN WG1 NR Ad Hoc Meeting R1-1709982 Qingdao, China, Jun. 27-30, 2017" Jun. 17, 2017, 9 pages.

Huawei etc. "UE-to-UE measurement for cross-link interference mitigation""3GPP TSG RAN WG1 Meeting #89 R1-1706911 Hangzhou, China, May 15-19, 2017" May 6, 2017, 7 pages.

ZTE."UE-to-UE measurement for cross-link interference mitigation" "3GPP TSG RAN WG1 Meeting NR Ad-Hoc#2 R1-1710128Qingdao, P.R.China, Jun. 27-30, 2017" Jun. 16, 2017, 9 pages.

CMCC "Discussion on UE-to-UE cross-link interference management""3GPP TSG RAN WG1 NR Ad-Hoc#2 R1-1710784 Qingdao, P.R. China Jun. 27-30, 2017" Jun. 17, 2017, 3 pages.

European Patent Office, Extended European Search Report Issued in Application No. 21945522.7, Jun. 27, 2024, Germany, 7 pages.

State Intellectual Property Office of the People's Republic of China, Office Action and Search Report Issued in Application No. 2021800018450, Jul. 15, 2025, 18 pages. (Submitted with Machine/Partial Translation).

CEWiT, "UE-to-UE cross-link interference management", R1-1716118, 3GPP TSG RAN WG1 Meeting NR#3, Nagoya, Japan, Sep. 18-21, 2017, 3 pages.

Ad-Hoc chair (Nokia), "Chairman's notes of AI 7.1.6—Duplexing", R1-1709683, 3GPP TSG RAN WG1 Meeting #89, Hangzhou, P.R. China May 15-19, 2017, 2 pages.

ISA State Intellectual Property Office of the People's Republic of China, Written Opinion of the International Searching Authority Issued in Application No. PCT/CN2021/100895, Dec. 1, 2021, WIPO, 9 pages.

* cited by examiner

INTERFERENCE MEASUREMENT METHOD AND APPARATUS THEREOF

CROSS-REFERENCE TO RELATED APPLICATIONS

This application is a national stage of International Application No. PCT/CN2021/100895, filed on Jun. 18, 2021, which is hereby incorporated by reference in its entirety.

TECHNICAL FIELD

The present disclosure relates to the technical field of communication, and in particular, to an interference measurement method and apparatus.

BACKGROUND

In related technologies, with the development of radio frequency technology and digital domain interference cancellation technology, in some scenarios, a full-duplex technology with same frequency and time can be used on a network side, but due to factors such as size and cost of a terminal device, Time Division Duplex (TDD) or Frequency Division Duplex (FDD) technology is needed on a terminal device side.

In such a scenario, since the network device may send and receive data at the same time and same frequency, mutual interference will occur between terminal devices in a same cell or adjacent cells. At present, there are no effective interference measurement methods, so the network device may send and receive data by using the full duplex technology with the same frequency and time when the interference between terminal devices is serious, which leads to poor data transmission efficiency and low accuracy.

SUMMARY

A first aspect of embodiments of the present disclosure provides an interference measurement method, performed by a first terminal device, where the method includes: receiving a measurement signal by using a receiving beam in a physical downlink shared channel (PDSCH) of the first terminal device; and determining an interference measurement result of the measurement signal.

In this technical solution, based on the measurement signal received through the receiving beam on the PDSCH of the first terminal device, the interference measurement result of the measurement signal can be determined, so that the first terminal device can determine other terminal devices having strong mutual interference to the first terminal device, which is convenient for a network device to schedule, and data receiving performed by the first terminal device and data sending performed by other terminal devices having strong mutual interference are avoided to be performed at same frequency and same time, thereby improving data transmission efficiency and accuracy.

Optionally, determining an interference measurement result of the measurement signal includes: determining, according to a measurement type configured by a network device, a measurement manner corresponding to the measurement type; performing channel quality measurement on the measurement signal according to the measurement manner to determine measurement data corresponding to the measurement type; and determining the interference measurement result according to the measurement data and a measurement threshold corresponding to the measurement type configured by the network device.

Optionally, determining the interference measurement result according to the measurement data and a measurement threshold corresponding to the measurement type configured by the network device includes: determining, according to a measurement type configured by a network device, a measurement manner corresponding to the measurement type; performing channel quality measurement on the measurement signal according to the measurement manner to determine measurement data corresponding to the measurement type; and determining the interference measurement result according to the measurement data and a measurement threshold corresponding to the measurement type configured by the network device.

Optionally, the measurement signal is determined to belong to to-be-reported interference signals, where the measurement data is greater than or equal to the measurement threshold; the measurement signal is determined not belong to to-be-reported interference signals, where the measurement data is less than the measurement threshold.

Optionally, reporting data of the measurement signal is determined, where the interference measurement result of the measurement signal is that the measurement signal belongs to to-be-reported interference signals; and the reporting data is sent to the network device.

Optionally, determining reporting data of the measurement signal includes: parsing the measurement signal to acquire a terminal device identifier, where a signal type of the measurement signal configured by the network device is an inter user equipment cross link interference reference signal (UE-CLI-RS); and generating the reporting data according to the terminal device identifier, a receiving time period of the measurement signal and the measurement data.

Optionally, determining reporting data of the measurement signal includes: generating the reporting data according to a receiving time period of the measurement signal and the measurement data, where the network device does not configure a signal type of the measurement signal.

Optionally, a channel for sending the reporting data is a physical uplink shared channel (PUSCH) or a physical uplink control channel (PUCCH).

Optionally, when the network device does not configure a signal type of the measurement signal, the measurement type configured by the network device is a received signal strength indicator (RSSI); or, the network device configures a signal type of the measurement signal as an inter user equipment cross link interference reference signal (UE-CLI-RS), and the measurement type configured by the network device includes at least one of: reference signal received power (RSRP), reference signal received quality (RSRQ), signal-to-interference plus noise ratio (SINR), or a received signal strength indicator (RSSI).

A second aspect of embodiments of the present disclosure provides an interference measurement method, performed by a second terminal device, where the method includes: generating a measurement signal; and sending the measurement signal by using a sending beam in a sending beam set.

Optionally, generating a measurement signal includes: generating the measurement signal with a signal type of an inter user equipment cross link interference reference signal (UE-CLI-RS) according to a terminal device identifier of the second terminal device, where a network device configures the signal type of the measurement signal as the UE-CLI-RS; or, generating the measurement signal with any signal type, where a network device does not configure the signal type of the measurement signal.

Optionally, the sending beam set is determined by: determining, according to a reference synchronization signal block (SSB) configured by a network device, a receiving beam for receiving the reference SSB; or, determining, according to a channel state information reference signal (CSI-RS) configured by a network device, a receiving beam of the CSI-RS; and generating the sending beam set according to a sending beam corresponding to the receiving beam.

A third aspect of embodiments of the present disclosure provides an interference measurement method, performed by a network device, where the method includes: receiving reporting data sent by a first terminal device; where the reporting data includes: measurement data and a receiving time period of a measurement signal, where the measurement signal is received by the first terminal device by using a receiving beam of a physical downlink shared channel (PDSCH) from a second terminal device, the measurement data corresponding to a measurement type of the measurement signal is greater than or equal to a measurement threshold corresponding to the measurement type.

Optionally, a sending beam set for sending the measurement signal is configured for the second terminal device; or, a sending beam set for sending the measurement signal and a signal type of the measurement signal are configured for the second terminal device.

Optionally, configuring a sending beam set includes: configuring a reference synchronization signal block (SSB), so as to determine the sending beam set according to a sending beam corresponding to a receiving beam of the reference SSB; or, configuring a channel state information reference signal (CSI-RS), so as to determine the sending beam set according to a sending beam corresponding to a receiving beam of the CSI-RS.

Optionally, the measurement type and the measurement threshold of the measurement signal of the first terminal device are configured; or, the measurement type, the measurement threshold and the signal type of the measurement signal of the first terminal device are configured.

Optionally, when a signal type of the measurement signal is not configured, the measurement type is configured as a received signal strength indication (RSSI), and the measurement threshold corresponding to the measurement type is configured; or, when a signal type of the measurement signal is configured as an inter user equipment cross link interference reference signal (UE-CLI-RS), the measurement type is configured to include at least one of: reference signal received power (RSRP), reference signal received quality (RSRQ), signal-to-interference plus noise ratio (SINR), or a received signal strength indicator (RSSI), and configuring the measurement threshold corresponding to the measurement type.

A fourth aspect of embodiments of the present disclosure provides an interference measurement apparatus, where the apparatus includes: a transceiving unit, configured to receive a measurement signal by using a receiving beam in a physical downlink shared channel (PDSCH) of a first terminal device; and a processing unit, configured to determine an interference measurement result of the measurement signal.

Optionally, the processing unit is specifically configured to perform operations including: determining, according to a measurement type configured by a network device, a measurement manner corresponding to the measurement type; performing channel quality measurement on the measurement signal according to the measurement manner to determine measurement data corresponding to the measurement type; and determining the interference measurement result according to the measurement data and a measurement threshold corresponding to the measurement type configured by the network device.

Optionally, the processing unit is specifically configured to perform operations including: determining that the measurement signal belongs to to-be-reported interference signals, where the measurement data is greater than or equal to the measurement threshold; determining that the measurement signal does not belong to to-be-reported interference signals, where the measurement data is less than the measurement threshold.

Optionally, the processing unit is further configured to perform operations including: determining reporting data of the measurement signal, where the interference measurement result of the measurement signal is that the measurement signal belongs to to-be-reported interference signals; and the transceiving unit is further configured to perform operations including: sending the reporting data to the network device.

Optionally, the processing unit is specifically configured to: parsing the measurement signal to acquire a terminal device identifier, where a signal type of the measurement signal configured by the network device is an inter user equipment cross link interference reference signal (UE-CLI-RS); and generating the reporting data according to the terminal device identifier, a receiving time period of the measurement signal and the measurement data.

Optionally, the processing unit is specifically configured to perform operations including: generating the reporting data according to a receiving time period of the measurement signal and the measurement data, where the network device does not configure a signal type of the measurement signal.

Optionally, a channel for sending the reporting data is a physical uplink shared channel (PUSCH) or a physical uplink control channel (PUCCH).

Optionally, when the network device does not configure a signal type of the measurement signal, the measurement type configured by the network device is a received signal strength indicator (RSSI); or, the network device configures a signal type of the measurement signal as an inter user equipment cross link interference reference signal (UE-CLI-RS), and the measurement type configured by the network device includes at least one of: reference signal received power (RSRP), reference signal received quality (RSRQ), signal-to-interference plus noise ratio (SINR), or a received signal strength indicator (RSSI).

A fifth aspect of embodiments of the present disclosure provides another interference measurement apparatus, where the apparatus includes: a processing unit, configured to generate a measurement signal; and a transceiving unit, configured to send the measurement signal by using a sending beam in a sending beam set.

Optionally, the processing unit is specifically configured to perform operations including: generating the measurement signal with a signal type of an inter user equipment cross link interference reference signal (UE-CLI-RS) according to a terminal device identifier of the second terminal device, where a network device configures the signal type of the measurement signal as the UE-CLI-RS; or, generating the measurement signal with any signal type, where a network device does not configure the signal type of the measurement signal.

Optionally, the sending beam set is determined by: determining, according to a reference synchronization signal block (SSB) configured by a network device, a receiving beam for receiving the reference SSB; or, determining, according to a channel state information reference signal (CSI-RS) configured by a network device, a receiving beam of the CSI-RS; and generating the sending beam set according to a sending beam corresponding to the receiving beam.

A sixth aspect of embodiments of the present disclosure provides another interference measurement apparatus, where the apparatus includes: a transceiving unit, configured to receive reporting data sent by a first terminal device; where the reporting data includes: measurement data and a receiving time period of a measurement signal, where the measurement signal is received by the first terminal device by using a receiving beam of a physical downlink shared channel (PDSCH) from a second terminal device, the measurement data corresponding to a measurement type of the measurement signal is greater than or equal to a measurement threshold corresponding to the measurement type.

Optionally, the apparatus further includes: a processing unit, configured to perform operations including: configuring a sending beam set for sending the measurement signal for the second terminal device; or, configuring a sending beam set for sending the measurement signal and a signal type of the measurement signal for the second terminal device.

Optionally, configuring a sending beam set includes: configuring a reference synchronization signal block (SSB), so as to determine the sending beam set according to a sending beam corresponding to a receiving beam of the reference SSB; or, configuring a channel state information reference signal (CSI-RS), so as to determine the sending beam set according to a sending beam corresponding to a receiving beam of the CSI-RS.

Optionally, the processing unit is further configured to perform operations including: configuring the measurement type and the measurement threshold of the measurement signal for receiving the first terminal device; or, configuring the measurement type, the measurement threshold and the signal type for receiving the measurement signal of the first terminal device.

Optionally, the processing unit is specifically configured to perform operations including: when a signal type of the measurement signal is not configured, configuring the measurement type as a received signal strength indication (RSSI), and configuring the measurement threshold corresponding to the measurement type; or, when a signal type of the measurement signal is configured as an inter user equipment cross link interference reference signal (UE-CLI-RS), configuring the measurement type including at least one of: reference signal received power (RSRP), reference signal received quality (RSRQ), signal-to-interference plus noise ratio (SINR), or a received signal strength indicator (RSSI), and configuring the measurement threshold corresponding to the measurement type.

A seventh aspect of embodiments of the present disclosure provides an interference measurement device, including: a processor and a memory, where the memory stores a computer program, and the processor executes the computer program stored in the memory so as to cause the device to perform the method according to the above-mentioned first aspect of embodiments; or the method according to the above-mentioned second aspect of embodiments.

An eighth aspect of embodiments of the present disclosure provides another interference measurement device, including: a processor and a memory, where the memory stores a computer program, and the processor executes the computer program stored in the memory so as to cause the device to perform the method according the above-mentioned third aspect of embodiments.

A ninth aspect of embodiments of the present disclosure provides another interference measurement device, including: a processor and an interface circuit; the interface circuit is configured to receive a code instruction and transmit the code instruction to the processor; and the processor is configured to execute the code instruction so as to perform the method according to the above-mentioned first aspect of embodiments; or the method according to the above-mentioned second aspect of embodiments.

A tenth aspect of embodiments of the present disclosure provides another interference measurement device, including: a processor and an interface circuit; the interface circuit is configured to receive a code instruction and transmit the code instruction to the processor; and the processor is configured to execute the code instruction so as to perform the method according to the above-mentioned third aspect of embodiments.

An eleventh aspect of embodiments of the present disclosure provides a computer-readable storage medium, configured to store an instruction, where when the instruction is executed, the method according to the above-mentioned first aspect of embodiments is implemented; or, the method according to the above-mentioned second aspect of embodiments is implemented.

A twelfth aspect of embodiments of the present disclosure provides another computer-readable storage medium, configured to store an instruction, where when the instruction is executed, the method according to the above-mentioned third aspect of embodiments is implemented.

Additional aspects and advantages of the present disclosure will be set forth in part in the following description, and in part will be obvious from the following description, or may be learned by practice of the present disclosure.

BRIEF DESCRIPTION OF DRAWINGS

In order to more clearly describe the technical solutions in the embodiments of the present disclosure or in the background technology, accompanying drawings needed in the embodiments of the present disclosure or in the background technology will be described below.

DETAILED DESCRIPTION

Figure 1:
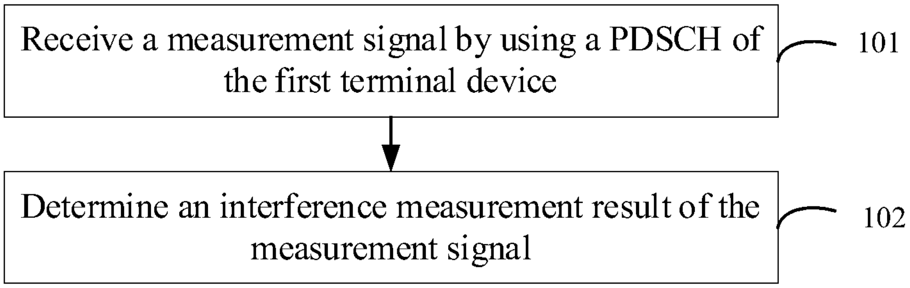
FIG. 1 is a schematic flowchart of an interference measurement method provided by an embodiment of the present disclosure.

Description will now be made in detail to illustrative embodiments, examples of which are shown in the accompanying drawings. When the following description refers to the drawings, unless otherwise indicated, same reference numerals in different drawings indicate the same or similar elements. Implementations described in the following illustrative embodiments do not represent all implementations consistent with the present disclosure. In contrary, they are merely examples of methods and apparatuses consistent with some aspects of the present disclosure as described in detail in the appended claims.

The terminologies used in the embodiments of the present disclosure are for the purpose of describing specific embodiments only and are not intended to limit the embodiments of the present disclosure. Singular forms "a" and "said" used in the specification of the embodiments of the present disclosure and the appended claims are also intended to include plural forms, unless the context clearly indicates other meaning. It should also be understood that the term "and/or" as used herein refers to and includes any or all possible combinations of one or more associated listed items.

It should be understood that although the terms "first", "second", "third", etc., may be used to describe various information in the embodiments of the present disclosure, these information should not be limited to these terms. These terms are only used to distinguish a same type of information from each other. For example, without departing from the scope of the embodiments of the present disclosure, first information may also be referred to as second information, and similarly, second information may also be referred to as first information. Depending on context, word "if" as used herein can be interpreted as "when" or "upon" or "in response to determining".

Hereinafter, embodiments of the present disclosure will be described in detail, examples of which are illustrated in the accompanying drawings, where the same or similar reference numerals indicate the same or similar elements throughout. The embodiments described below by referring to the accompanying drawings are exemplary and are intended to describe the present disclosure, and should not be construed as limiting the present disclosure.

FIG. 1 shows an interference measurement method provided by an embodiment of the present disclosure. It shall be noted that, the interference measurement method of the embodiments of the present disclosure is performed by a first terminal device.

As shown in FIG. 1, the interference measurement method may include the following steps.

Step 101, receiving a measurement signal by using a receiving beam in a physical downlink shared channel (PDSCH) of the first terminal device.

In an embodiment of the present disclosure, a second terminal device can send the generated measurement signal to the first terminal device, and the first terminal device can use the receiving beam of the physical downlink shared channel (PDSCH) to receive the measurement signal. The measurement signal may be various types of reference signals, or may be data signals, or may be other signals generated by the second terminal device. In addition, the receiving beam may be pre-configured, or may be indicated by a network device, or may be determined according to beam measurement, and the receiving beam may be a wide beam or a narrow beam, where a width of the beam can be flexibly configured according to actual needs, and the receiving beam may be a set of receiving beams generated by the first terminal device. It shall be noted that the second terminal device may be UE-A (User Equipment A), and the first terminal device may be UE-B (User Equipment B).

Step 102, determining an interference measurement result of the measurement signal.

Optionally, after receiving the measurement signal, the first terminal device can parse the measurement signal, and can determine the second terminal device sending the measurement signal according to a parsing result. The first terminal device can also determine measurement data of the measurement signal according to the received measurement signal, and can also determine whether the second terminal device sending the measurement signal causes interference to the first terminal device according to the measurement result.

As described above, based on the measurement signal received through the receiving beam on the PDSCH of the first terminal device, the interference measurement result of the measurement signal can be determined, so that the first terminal device can determine other terminal devices having strong mutual interference to the first terminal device, which is convenient for a network device to schedule, and data receiving performed by the first terminal device and data sending performed by other terminal devices having strong mutual interference are avoided to be performed at same frequency and same time, thereby improving data transmission efficiency and accuracy.

Figure 2:
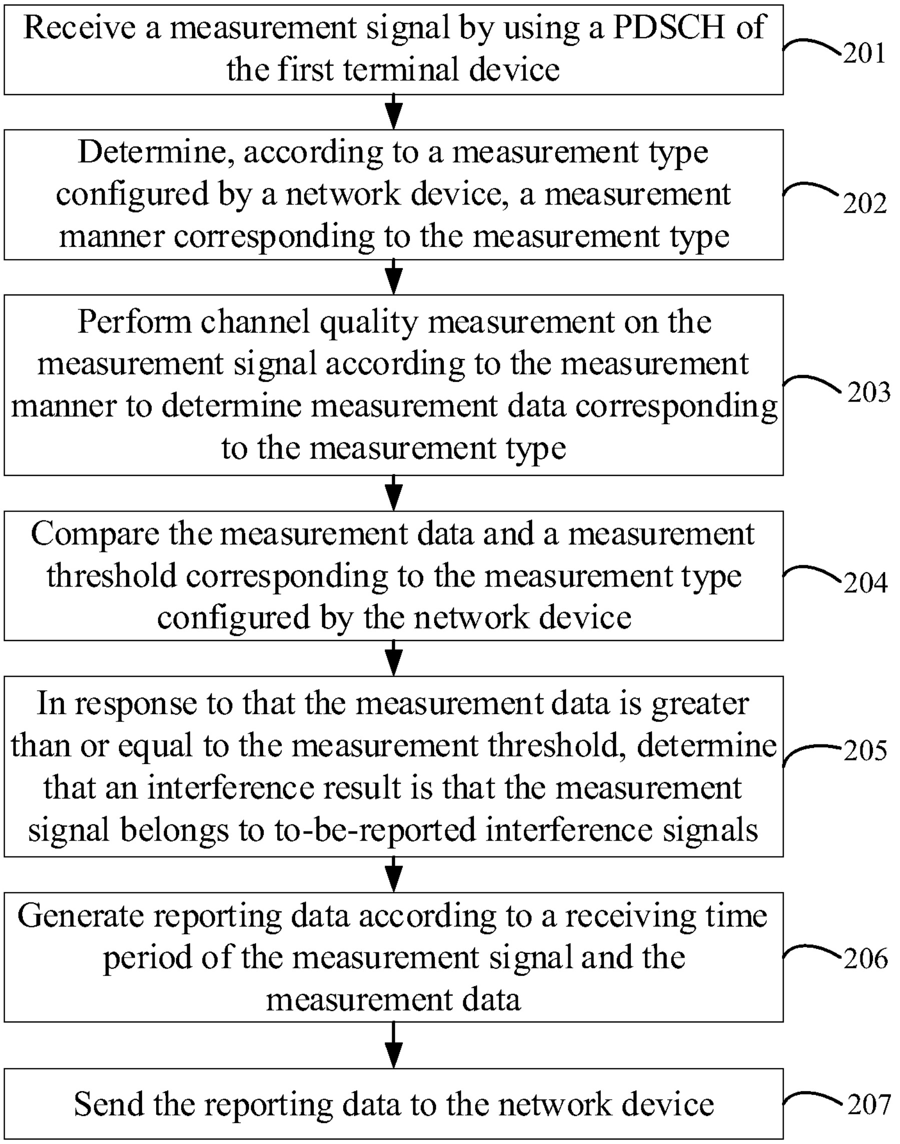
FIG. 2 is a schematic flowchart of another interference measurement method provided by an embodiment of the present disclosure.

An embodiment of the present disclosure provides another interference measurement method. FIG. 2 is a schematic flowchart of another interference measurement method provided by an embodiment of the present disclosure, where the method can be performed by a first terminal device. The interference measurement method can be performed independently, or can be performed in combination with any embodiment or possible implementations in an embodiment in the present disclosure, or can be performed in combination with any technical solution in related arts.

As shown in FIG. 2, the interference measurement method may include following steps.

Step 201, receiving a measurement signal by using a receiving beam in a physical downlink shared channel (PDSCH) of the first terminal device.

Optionally, the first terminal device can use the receiving beam to receive the measurement signal sent by the second terminal device on a time-frequency resource configured by a network device. It should be noted that the time-frequency resource may be a time-frequency resource configured by a network device (such as a base station) through signaling, or may be a time-frequency resource in a time-frequency resource pool configured by a network device through signaling. In addition, among the time-frequency resources for receiving signals by the first terminal device and the time-frequency resources for sending signals by the second terminal device, there are resources with the same time and the same frequency.

Step 202, determining, according to a measurement type configured by a network device, a measurement manner corresponding to the measurement type.

Optionally, the measurement type configured by the network device is determined according to a signal type of the measurement signal configured by the network device.

In an embodiment, the network device does not configure the signal type of the measurement signal, and the measurement type configured by the network device is determined as a received signal strength indicator (RSSI).

In an embodiment, the network device configures the signal type of the measurement signal as an inter-UE cross link interference reference signal (UE-CLI-RS), and the measurement type configured by the network device includes at least one of: reference signal received power (RSRP), reference signal received quality (RSRQ), signal-to-interference plus noise ratio (SINR), and received signal strength indicator (RSSI).

Step 203, performing channel quality measurement on the measurement signal according to the measurement manner to determine measurement data corresponding to the measurement type.

In an embodiment of the present disclosure, the first terminal device performs channel quality measurement on the measurement signal according to the measurement manner determined in step 202, so as to determine the measurement data corresponding to the measurement type. The measurement data is data obtained by the first terminal device for measurement in a process of receiving the above measurement signal, and there are corresponding measurement data for each measurement type. When there are multiple measurement types, measurement data corresponding to each measurement type is determined, so as to obtain multiple pieces of measurement data.

Optionally, in response to that the measurement type is RSSI, the measurement data is RSSI when the first terminal device receives the measurement signal; in response to that the measurement type is RSRP, the measurement data is RSRP when the first terminal device receives the measurement signal; in response to that the measurement type is RSRQ, the measurement data is RSRQ when the first terminal device receives the measurement signal; in response to that the measurement type is SINR, the measurement data is SINR when the first terminal device receives the measurement signal.

It should be noted that RSRQ is N times of a ratio of RSRP to RSSI, RSRQ=N*RSRP/RSSI, where N represents a number of RBs (resource blocks) contained in a measurement bandwidth of RSSI, and RSRQ can reflect a relative size between the received measurement signal and interference; SINR may be a ratio of strength of the measurement signal to strength of an interference signal (noise and interference) received by the first terminal device.

Step 204, comparing the measurement data and a measurement threshold corresponding to the measurement type configured by the network device.

In an embodiment of the present disclosure, the measurement data may include one or more of RSRP, RSRQ, SINR and RSSI, and measurement thresholds corresponding to different data in the measurement data are also different. It should be noted that the measurement threshold corresponding to the measurement data is configured by the network device or determined according to a protocol.

Step 205, in response to the measurement data being greater than or equal to the measurement threshold, determining that an interference result is that the measurement signal belongs to to-be-reported interference signals.

As an example, when the measurement data includes one of RSRP, RSRQ, SINR or RSSI, and when the measurement data is greater than or equal to the measurement threshold corresponding to the measurement data, the interference measurement result can be determined as that the measurement signal belongs to to-be-reported interference signals of the first terminal device.

As another example, when the measurement data includes two or more of RSRP, RSRQ, SINR and RSSI, the measurement thresholds corresponding to different data in the measurement data can be obtained respectively, and when any data in the measurement data is greater than the corresponding measurement threshold, the interference measurement result can be determined as that the measurement signal belongs to to-be-reported interference signals of the first terminal device.

Further, in response to, a comparison result that the measurement data is less than the measurement threshold indicates that the interference result is that the measurement signal does not belong to the to-be-reported interference signals.

As an example, when the measurement data includes one of RSRP, RSRQ, SINR or RSSI, and when the measurement data is less than the measurement threshold corresponding to the measurement data, the interference measurement result can be determined as that the measurement signal does not belong to to-be-reported interference signals of the first terminal device.

As another example, when the measurement data includes two or more of RSRP, RSRQ, SINR and RSSI, when all the data in the measurement data are less than the corresponding measurement threshold, the interference measurement result can be determined as that the measurement signal does not belong to to-be-reported interference signals of the first terminal device.

Step 206, generating reporting data according to a receiving time period of the measurement signal and the measurement data.

The receiving time period of the measurement signal may be slot indexes of slots for receiving the measurement signal, or may be other indication information that can determine time information for receiving the measurement signal.

In an embodiment, in response to that the signal type of the measurement signal is UE-CLI-RS, the first terminal device parses the UE-CLI-RS, and a terminal device identifier of the second terminal device that sent the UE-CLI-RS can be obtained according to a parsing result.

Further, the reporting data is generated according to the terminal device identifier, the receiving time period of UE-CLI-RS and the measurement data.

Step 207, sending the reporting data to the network device.

A channel for sending the reporting data is a physical uplink shared channel (PUSCH) or a physical uplink control channel (PUCCH).

As described above, a receiving beam is used to receive a measurement signal; a measurement manner corresponding to a measurement type is determined according to the measurement type configured by a network device; where when the network device does not configure a signal type of the measurement signal, the measurement type is RSSI; channel quality measurement is performed on the measurement signal according to the measurement manner so as to determine measurement data corresponding to the measurement type; when the measurement data is greater than or equal to a measurement threshold, an interference result is determined as that the measurement signal belongs to to-be-reported interference signals; reporting data is generated according to a receiving time period of the measurement signal and the measurement data; and the reporting data is sent to the network device.

When the network device configures the signal type of the measurement signal as UE-CLI-RS, the measurement type includes at least one of RSRP, RSRQ, SINR or RSSI; channel quality measurement is performed on the measurement signal according to the measurement manner corresponding to the measurement type, so as to determine measurement data corresponding to the measurement type; when the measurement data is greater than or equal to a measurement threshold, an interference result is determined as that the UE-CLI-RS belongs to to-be-reported interference signals; the UE-CLI-RS is parsed to obtain a terminal device identifier; reporting data is generated according to the terminal device identifier, a receiving time period of the UE-CLI-RS and the measurement data; and the reporting data is sent to the network device. According to the method, a second terminal device that sent the UE-CLI-RS is determined by parsing the UE-CLI-RS, and it is determined whether the UE-CLI-RS belongs to to-be-reported interference measurement signals of the first terminal device according to the measurement data of the UE-CLI-RS, and when the UE-CLI-RS belongs to the to-be-reported interference measurement signals of the first terminal device, the terminal device identifier of the second terminal device parsed from the UE-CLI-RS, the receiving time period of the UE-CLI-RS and the measurement data are sent to the network device. In such way, the first terminal device can determine the second terminal device having mutual interference with the first terminal device, which is convenient for the network device to schedule, thereby improving data transmission efficiency and accuracy.

The interference measurement method of the embodiments of the present disclosure is performed by the first terminal device, and by receiving the measurement signal through the receiving beam, the interference measurement result of the measurement signal can be determined, so that the first terminal device can determine the second terminal device having mutual interference with the first terminal device, which is convenient for the network device to schedule, and data receiving performed by the first terminal device and data sending performed by the second terminal device are avoided to be performed at same frequency and same time, thereby improving data transmission efficiency and accuracy.

Figure 3:
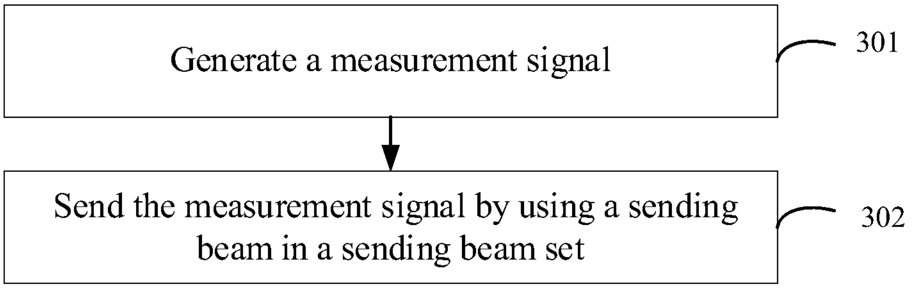
FIG. 3 is a schematic flowchart of another interference measurement method provided by an embodiment of the present disclosure.

An embodiment of the present disclosure provides another interference measurement method. FIG. 3 is a schematic flowchart of another interference measurement method provided by an embodiment of the present disclosure. The interference measurement method can be performed by a second terminal device, for example, the second terminal device may be UE-A.

As shown in FIG. 3, the interference measurement method may include the following steps.

Step 301, generating a measurement signal.

The measurement signal may be various types of reference signals, or may be data signals, or may be other signals generated by the second terminal device. In addition, the measurement signal may be generated according to configuration in a network device.

Step 302, sending the measurement signal by using a sending beam in a sending beam set.

The sending beam set may be pre-configured, or may be configured by a network device, or may be determined through beam measurement.

As described above, the second terminal device generates the measurement signal, and sends the measurement signal through the sending beam in the sending beam set. The first terminal device can receive the measurement signal through a receiving beam, and can determine the second terminal device having mutual interference with the first terminal device according to the received measurement signal, which is convenient for the network device to schedule, and data receiving performed by the first terminal device and data sending performed by the second terminal device are avoided to be performed at same frequency and same time, thereby improving data transmission efficiency and accuracy.

Figure 4:
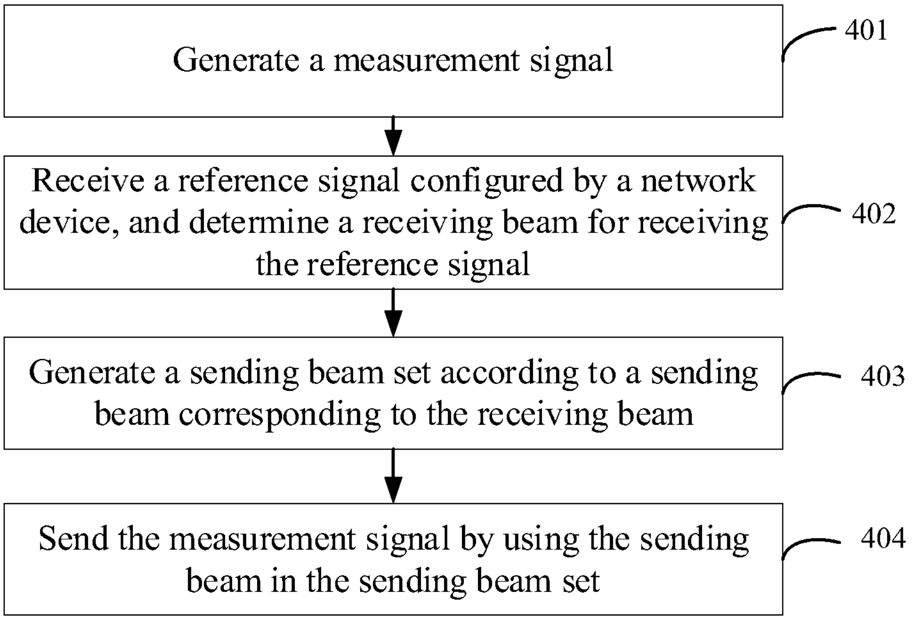
FIG. 4 is a schematic flowchart of another interference measurement method provided by an embodiment of the present disclosure.

An embodiment of the present disclosure provides another interference measurement method. FIG. 4 is a schematic flowchart of another interference measurement method provided by an embodiment of the present disclosure. The interference measurement method can be performed by a second terminal device.

As shown in FIG. 4, the interference measurement method may include following steps.

Step 401, generating a measurement signal.

In an embodiment, in response to that the network device configures a signal type of the measurement signal as UE-CLI-RS, the UE-CLI-RS is generated according to a terminal device identifier of the second terminal device.

Optionally, as an example, UE-CLI-RS r (m) can be generated according to following formula:

$$r(m)=\frac{1}{\sqrt{2}}(1-2c(2m))+j\frac{1}{\sqrt{2}}(1-2c(2m+1));$$

where m and n represents an integer greater than or equal to 0 respectively; c (n) can be generated according to the following formula:

$$c(n)=(x_1(n+N_C)+x_2(n+N_C))\bmod 2;$$

$$x_1(n+31)=(x_1(n+3)+x_1(n))\bmod 2;$$

$$x_2(n+31)=(x_2(n+3)+x_2(n+2)+x_2(n+1)+x_2(n))\bmod 2;$$

where, $N_C$=1600; n represents an integer greater than or equal to 0, $x_1(0)=1$, $x_1(n)=1, 2, \ldots 30$, an initial value of $x_2(n)$ is determined according to an identifier, a wireless frame number, a sub-frame number and other time-related parameters of the second terminal device.

Optionally, as an example, UE-CLI-RS r (n) can be generated according to following formula:

$$r(n)=e^{j\alpha n}\bar{r}(n),\ 0\le n\le N;$$

$$\bar{r}_q(n)=x_q(n \bmod N);$$

$$x_q(m)=e^{-j\frac{\pi qm(m+1)}{N}};$$

where, N represents a sequence length, n represents an integer greater than or equal to 0, and less than or equal to N, values of α, q can be determined according to an identifier, a wireless frame number, a sub-frame number and other time-related parameters of the second terminal device respectively.

In another implementation, in response to that the network device does not configure a signal type of the measurement signal, the measurement signal of any signal type is generated.

Optionally, the measurement signal may be a data signal, or may be a reference signal, or may be other signals generated by the second terminal device. That is, the second terminal device can generate a signal of any type and take the signal as the measurement signal.

Step 402, receiving a reference signal configured by a network device, and determining a receiving beam for receiving the reference signal.

Optionally, the network device uses a beam in a beam set to send the configured reference signal to the second terminal device, and the second terminal device uses the receiving beam to receive the reference signal, and determines an optimal receiving beam corresponding to each beam. The beam set may be pre-configured, or may be determined according to information of the second terminal device. The network device adopts the beam in the beam set to send a reference synchronization signal block (SSB) or a channel state information reference signal (CSI-RS).

In an implementation, the network device configures the reference SSB, the second terminal device receives the reference SSB and determines a receiving beam of the reference SSB.

In another implementation, the network device configures the CSI-RS, the second terminal device receives the CSI-RS, and determines a receiving beam of the CSI-RS.

Step 403, generating a sending beam set according to a sending beam corresponding to the receiving beam.

The receiving beam is determined in step 402.

Optionally, using reciprocity of beams, the sending beam set is generated according to the sending beam corresponding to the determined receiving beam.

Step 404, sending the measurement signal by using the sending beam in the sending beam set.

The sending beam set is the sending beam set generated in step 403.

Optionally, each sending beam in the sending beam set is used to send the measurement signal.

Optionally, a time-frequency resource for sending the measurement signal is a time-frequency resource configured by the network device, or a time-frequency resource selected from a time-frequency resource pool configured by the network device.

In an embodiment of the present disclosure, the second terminal device sends the generated measurement signal by using the sending beam in the sending beam set configured by the network device. It shall be noted that, the time-frequency resource used by the second terminal device to send the measurement signal is a time-frequency resource configured by the network device through signaling, or a time-frequency resource selected from a time-frequency resource pool configured by the network device through signaling. In addition, it shall also be noted that, among the time-frequency resources for receiving signals by the first terminal device receiving the measurement signal and the time-frequency resources for sending signals by the second terminal device, there are resources with the same time and the same frequency.

As described above, according to the signal type of the measurement signal configured by the network device, the second terminal device generates the measurement signal; when the signal type is the UE-CLI-RS, the UE-CLI-RS is generated according to the terminal device identifier of the second terminal device; the sending beam in the sending beam set configured by the network device is used to send the measurement signal, where the sending beam set is determined according to the sending beam corresponding to the receiving beam for receiving the reference signal configured by the network device. In the method, the second terminal device uses the sending beam in the sending beam set configured by the network device to send the measurement signal, which improves data transmission quality, and can generate the UE-CLI-RS can according to the identifier of the second terminal device, and can send the UE-CLI-RS to the first terminal device. After receiving the UE-CLI-RS, the first terminal device determines the second terminal device having mutual interference with the first terminal device according to the UE-CLI-RS, which is convenient for the network device to schedule, and data receiving performed by the first terminal device and data sending performed by the second device are avoided to be performed at same frequency and same time, thereby improving data transmission efficiency and accuracy.

The interference measurement method of the embodiments of the present disclosure is performed by the second terminal device, the measurement signal is generated according to the signal type configured by the network device; the measurement signal is sent by using the sending beam in the sending beam set configured by the network device, and the method causes the second terminal device to send the signal by using the sending beam in the sending beam set configured by the network device, which improves data transmission quality, and the measurement signal can be flexibly generated according to the signal type configured by the network device, which reduces system cost, and the measurement signal is sent to the first terminal device, and after receiving the measurement signal, the first terminal device can determine the second terminal device having mutual interference to the first terminal device according to the measurement signal, which is convenient for the network device to schedule, and data receiving performed by the first terminal device and data sending performed by the second device are avoided to be performed at same frequency and same time, thereby improving data transmission efficiency and accuracy.

Figure 5:
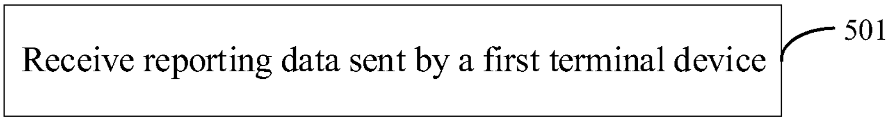
FIG. 5 is a schematic flowchart of another interference measurement method provided by an embodiment of the present disclosure.

An embodiment of the present disclosure provides another interference measurement method. FIG. 5 is a schematic flowchart of another interference measurement method provided by an embodiment of the present disclosure. The interference measurement method can be performed by a network device.

As shown in FIG. 5, the interference measurement method may include the following steps.

Step 501, receiving reporting data sent by a first terminal device.

The reporting data includes: measurement data and a receiving time period of a measurement signal, where the measurement signal is received by the first terminal device by using a receiving beam of a physical downlink shared channel (PDSCH) from a second terminal device, the measurement data corresponding to a measurement type of the measurement signal is greater than or equal to a measurement threshold corresponding to the measurement type.

It shall be noted that, the receiving time period of the measurement signal refers to information indicating the receiving time of the measurement signal, such as the indices of receiving slots of the measurement signal. According to the receiving time period of the measurement signal, the network device can speculate the sending beam, and further speculate a second terminal device that sent the measurement signal, so as to perform network scheduling and improve efficiency of the network scheduling.

Optionally, a channel for receiving the reporting data is a physical uplink shared channel (PUSCH) or a physical uplink control channel (PUCCH).

Optionally, after receiving the reporting data, the network device can determine a scheduling strategy of terminals according to the reporting data, so that data receiving performed by the first terminal device and data sending performed by the second terminal device that have mutual interference are avoided to be performed at the same frequency and the same time.

As described above, the measurement data and the receiving time period of the measurement signal sent by the first terminal device are received, where the measurement signal belongs to to-be-reported interference signals of the first terminal device, and the measurement data is measurement data of the measurement signal received by the first terminal device from the second terminal device. Further, the scheduling strategy of the first terminal device and the second terminal device can be determined according to the measurement data. According to the method, after receiving the measurement signal, the first terminal device can determine the second terminal device having mutual interference with the first terminal device according to the measurement signal, and report the measurement data and the receiving time period to the network device, which is convenient for the network device to schedule, and data receiving performed by the first terminal device and data sending performed by the second terminal device are avoided to be performed at same frequency and same time, thereby improving data transmission efficiency and accuracy.

Figure 6:
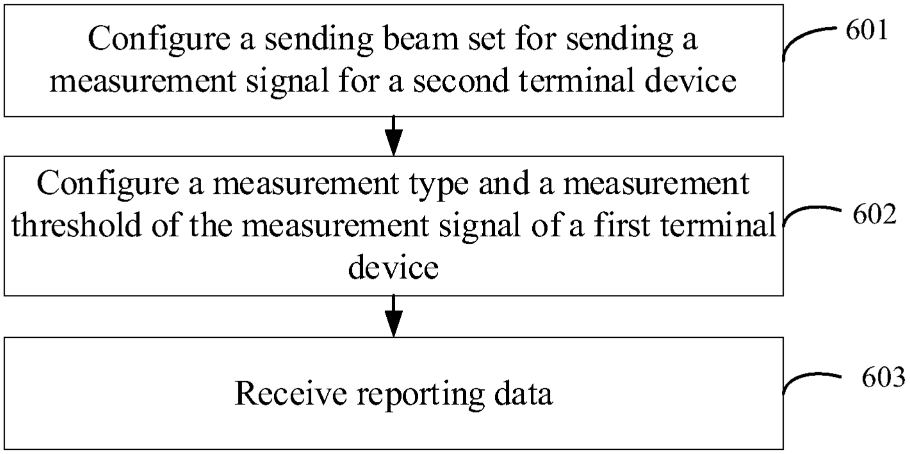
FIG. 6 is a schematic flowchart of another interference measurement method provided by an embodiment of the present disclosure.

An embodiment of the present disclosure provides another interference measurement method. FIG. 6 is a schematic flowchart of another interference measurement method provided by an embodiment of the present disclosure. The interference measurement method can be performed by a network device.

As shown in FIG. 6, the interference measurement method may include the following steps.

Step 601, configuring a sending beam set for sending a measurement signal for a second terminal device.

Optionally, the network device uses a beam in a beam set to send the configured reference signal to the second terminal device, and the second terminal device uses a receiving beam to receive the reference signal, and determines an optimal receiving beam corresponding to each beam. The beam set may be pre-configured, or may be determined according to information of the second terminal device, for example, may be determined according to position information of the second terminal device. The network device adopts the beam in the beam set to send a reference synchronization signal block (SSB) or a channel state information reference signal (CSI-RS).

In an embodiment, the network device configures a reference synchronization signal block (SSB), so as to determine the sending beam set according to a sending beam corresponding to a receiving beam of the reference SSB.

In another embodiment, the network device configures a channel state information reference signal (CSI-RS), so as to determine the sending beam set according to a sending beam corresponding to a receiving beam of the CSI-RS.

Further, the network device can also configure a signal type of the measurement signal, for example, the signal type of the measurement signal is configured as an inter-UE cross link interference reference signal (UE-CLI-RS), which is indicated to the second terminal device through signaling.

Further, the network device can also configure a time-frequency resource for sending the measurement signal for the second terminal device, or configure a time-frequency resource for sending the measurement signal for the second terminal device as a time-frequency resource in a time-frequency resource pool.

Step 602, configuring a measurement type and a measurement threshold of the measurement signal of a first terminal device.

In an embodiment, when the signal type of the measurement signal is not configured, the measurement type is a received signal strength indication (RSSI), and the measurement threshold corresponding to the measurement type is configured.

In another embodiment, when the signal type of the measurement signal is configured as an inter user equipment cross link interference reference signal (UE-CLI-RS), the measurement type is configured to include at least one of: reference signal received power (RSRP), reference signal received quality (RSRQ), signal-to-interference plus noise ratio (SINR), or a received signal strength indicator (RSSI), and the measurement threshold corresponding to the measurement type is configured.

Further, the network device can also configure a time-frequency resource for receiving the measurement signal for the first terminal device, or configure a time-frequency resource for receiving the measurement signal for the first terminal device as a time-frequency resource in a time-frequency resource pool.

Step 603, receiving reporting data.

In an embodiment of the present disclosure, it shall be noted that, among the time-frequency resources for receiving signals by the first terminal device and the time-frequency resources for sending signals by the second terminal device configured by the network device, there are resources with same time and same frequency.

As described above, the measurement data and the receiving time period of the measurement signal sent by the first terminal device are received, where the measurement signal belongs to to-be-reported interference signals of the first terminal device, and the measurement data is measurement data of the measurement signal received by the first terminal device from the second terminal device. Further, the scheduling strategy of the first terminal device and the second terminal device can be determined according to the measurement data. According to the method, after receiving the measurement signal, the first terminal device can determine the second terminal device having mutual interference with the first terminal device according to the measurement signal, and report the measurement data and the receiving time period to the network device, which is convenient for the network device to schedule, and data receiving performed by the first terminal device and data sending performed by the second terminal device are avoided to be performed at same frequency and same time, thereby improving data transmission efficiency and accuracy.

Figure 7:
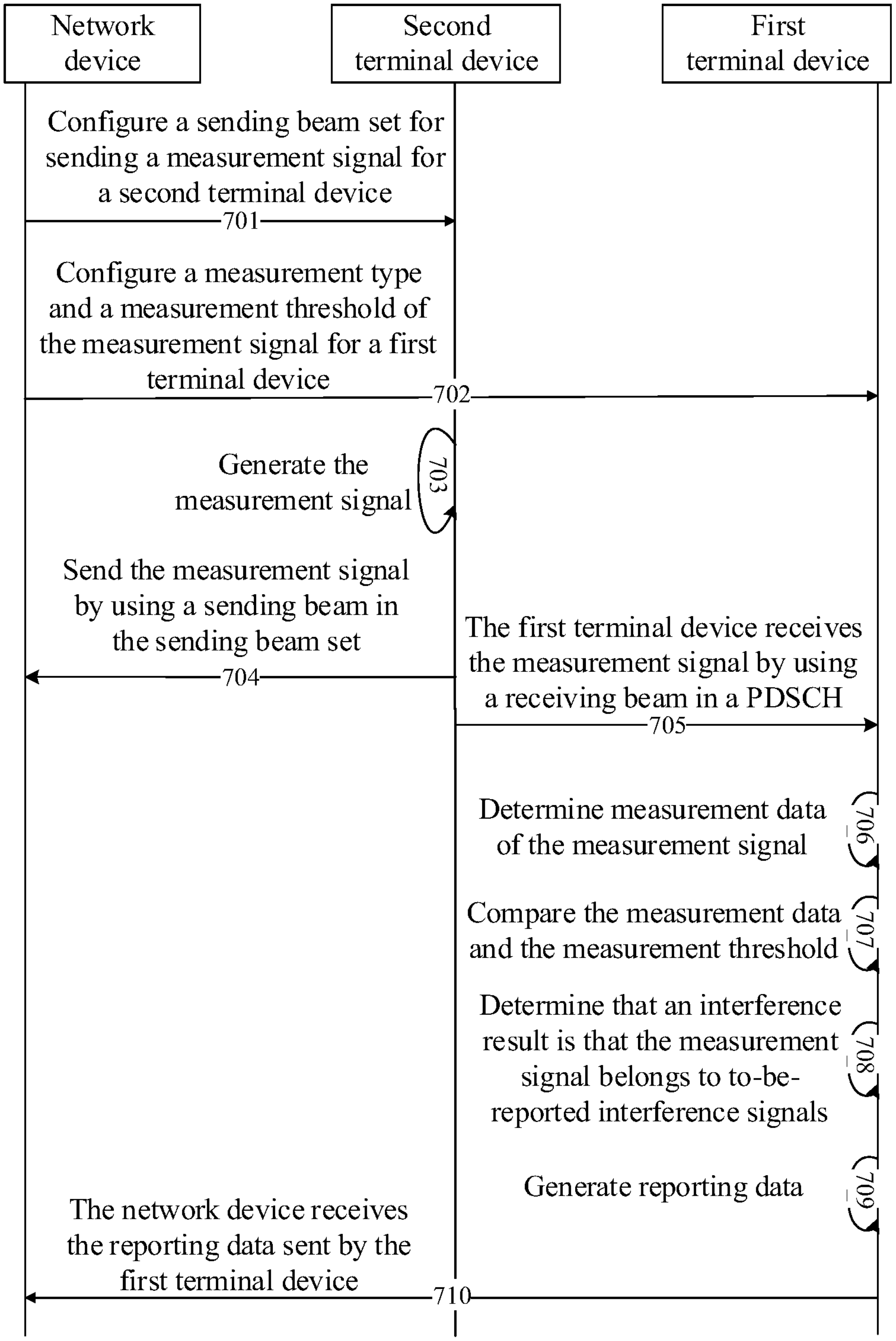
FIG. 7 is a schematic flowchart of another interference measurement method provided by an embodiment of the present disclosure.

An embodiment of the present disclosure provides another interference measurement method. FIG. 7 is a schematic flowchart of another interference measurement method provided by an embodiment of the present disclosure.

As shown in FIG. 7, the interference measurement method may include following steps.

Step 701, a network device configures a sending beam set for sending a measurement signal for a second terminal device.

Optionally, the network device uses a beam in a beam set to send a configured reference signal to the second terminal device, and the second terminal device uses the receiving beam to receive the reference signal, and determines an optimal receiving beam corresponding to each beam. Using reciprocity of beams, the sending beam set is determined according to the sending beam corresponding to the determined receiving beam.

In an embodiment, the network device configures a reference synchronization signal block (SSB), so as to determine the sending beam set according to a sending beam corresponding to a receiving beam of the reference SSB.

In another embodiment, the network device configures a channel state information reference signal (CSI-RS), so as to determine the sending beam set according to a sending beam corresponding to a receiving beam of the CSI-RS.

Further, the network device can also configure a signal type of the measurement signal, for example, the signal type of the measurement signal is configured as an inter-UE cross link interference reference signal (UE-CLI-RS), which is indicated to the second terminal device through signaling.

Further, the network device can also configure a time-frequency resource for sending the measurement signal for the second terminal device, or configure a time-frequency resource for sending the measurement signal for the second terminal device as a time-frequency resource in a time-frequency resource pool.

Step 702, the network device configures a measurement type and a measurement threshold of the measurement signal for a first terminal device.

In an embodiment, when the network device does not configure the signal type of the measurement signal, the measurement type is a received signal strength indication (RSSI), and the measurement threshold corresponding to the measurement type is configured.

In another embodiment, when the network device configures the signal type of the measurement signal as an inter user equipment cross link interference reference signal (UE-CLI-RS), the measurement type is configured to include at least one of: reference signal received power (RSRP), reference signal received quality (RSRQ), signal-to-interference plus noise ratio (SINR), or a received signal strength indicator (RSSI), and the measurement threshold corresponding to the measurement type is configured.

Further, the network device can also configure a time-frequency resource for receiving the measurement signal for the first terminal device, or configure a time-frequency resource for receiving the measurement signal for the first terminal device as a time-frequency resource in a time-frequency resource pool.

Step 703, the second terminal device generates the measurement signal.

In an embodiment, in response to that the network device configures a signal type of the measurement signal as UE-CLI-RS, the UE-CLI-RS is generated according to a terminal device identifier of the second terminal device.

In another implementation, in response to that the network device does not configure a signal type of the measurement signal, the measurement signal of any signal type is generated.

Step 704, the second terminal device sends the measurement signal by using a sending beam in the sending beam set.

Optionally, each sending beam in the sending beam set is used to send the measurement signal.

Step 705, the first terminal device receives the measurement signal by using a receiving beam in a physical downlink shared channel (PDSCH).

Step 706, the first terminal device determines measurement data of the measurement signal according to the measurement type.

Step 707, the first terminal device compares the measurement data and the measurement threshold.

Step 708, the measurement data is greater than or equal to the measurement threshold, and the first terminal device determines that an interference result is that the measurement signal belongs to to-be-reported interference signals.

Further, when the measurement data is less than the measurement threshold, the interference result is determined as that the measurement signal does not belong to to-be-reported interference signals.

Step 709, the first terminal device generates reporting data.

Step 710, the network device receives the reporting data sent by the first terminal device.

Optionally, a channel for receiving the reporting data is a physical uplink shared channel (PUSCH) or a physical uplink control channel (PUCCH).

Optionally, after receiving the reporting data, the network device can determine a scheduling strategy of terminals according to the reporting data, so that data receiving performed by the first terminal device and data sending performed by the second terminal device that have mutual interference are avoided to be performed at the same frequency and the same time.

In an embodiment of the present disclosure, it shall be noted that, among the time-frequency resources for receiving signals by the first terminal device and the time-frequency resources for sending signals by the second terminal device configured by the network device, there are resources with the same time and the same frequency.

As described above, the network device configures the sending beam set for sending the measurement signal of the second terminal device, and can further configure the signal type of the measurement signal; the network device configures the measurement type and the measurement threshold of the measurement signal of the first terminal device; the second terminal device generates the measurement signal according to the configured signal type, and sends the measurement signal by using the sending beam in the sending beam set configured by the network device; the first terminal device receives the measurement signal by using the receiving beam on PDSCH; the network device receives the measurement data and the receiving time period of the measurement signal sent by the first terminal device, where the measurement signal belongs to to-be-reported interference signals of the first terminal device; and the measurement data is measurement data of the measurement signal received from the second terminal device. Further, the scheduling strategy of the first terminal device and the second terminal device can be determined according to the measurement data. The method causes the second terminal device to send the signal by using the sending beam in the sending beam set configured by the network device, which improves data transmission quality. The measurement signal can be flexibly generated according to the signal type configured by the network device, which reduces system cost. After receiving the measurement signal, the first terminal device can determine the second terminal device having mutual interference to the first terminal device according to the measurement signal, and can report the measurement data and receiving time period to the network device, which is convenient for the network device to schedule, data receiving performed by the first terminal device and data sending performed by the second device are avoided to be performed at same frequency and same time, thereby improving data transmission efficiency and accuracy.

Corresponding to the interference measurement method provided in the embodiments of FIGS. 1 and 2, the present disclosure further provides an interference measurement apparatus. Since the interference measurement apparatus provided by the embodiments of the present disclosure corresponds to the interference measurement method provided in embodiments of FIGS. 1 and 2, the implementations of the interference measurement method can also be adapted to the interference measurement apparatus provided by the embodiment of the present disclosure, which will not be described in detail in the embodiments of the present disclosure.

Figure 8:
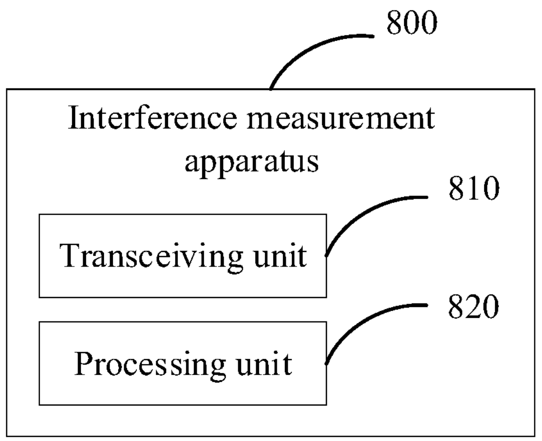
FIG. 8 is a schematic structural diagram of an interference measurement apparatus provided by an embodiment of the present disclosure.

FIG. 8 is a schematic structural diagram of an interference measurement apparatus provided by an embodiment of the present disclosure.

As shown in FIG. 8, the interference measurement apparatus 800 includes: a transceiving unit 810 and a processing unit 820.

The transceiving unit 810 is configured to receive a measurement signal by using a receiving beam in a physical downlink shared channel (PDSCH) of a first terminal device; and the processing unit 820 is configured to determine an interference measurement result of the measurement signal.

As an implementation of an embodiment of the present disclosure, the processing unit 810 is specifically configured to perform operations including: determining, according to a measurement type configured by a network device, a measurement manner corresponding to the measurement type; performing channel quality measurement on the measurement signal according to the measurement manner to determine measurement data corresponding to the measurement type; and determining the interference measurement result according to the measurement data and a measurement threshold corresponding to the measurement type configured by the network device.

As an implementation of an embodiment of the present disclosure, the processing unit 820 is specifically configured to perform operations including: determining that the measurement signal belongs to to-be-reported interference signals, where the measurement data is greater than or equal to the measurement threshold; determining that the measurement signal does not belong to to-be-reported interference signals, where the measurement data is less than the measurement threshold.

As an implementation of an embodiment of the present disclosure, the processing unit 820 is further configured to perform operations including: determining reporting data of the measurement signal, where the interference measurement result of the measurement signal is that the measurement signal belongs to to-be-reported interference signals; and the transceiving unit is further configured to perform operations including: sending the reporting data to the network device.

As an implementation of an embodiment of the present disclosure, the processing unit 820 is specifically configured to: parsing the measurement signal to acquire a terminal device identifier, where a signal type of the measurement signal configured by the network device is an inter user equipment cross link interference reference signal (UE-CLI-RS); and generating the reporting data according to the terminal device identifier, a receiving time period of the measurement signal and the measurement data.

As an implementation of an embodiment of the present disclosure, the processing unit 820 is specifically configured to perform operations including: generating the reporting data according to a receiving time period of the measurement signal and the measurement data, where the network device does not configure a signal type of the measurement signal.

As an implementation of an embodiment of the present disclosure, a channel for sending the reporting data is a physical uplink shared channel (PUSCH) or a physical uplink control channel (PUCCH).

As an implementation of an embodiment of the present disclosure, when the network device does not configure a signal type of the measurement signal, the measurement type configured by the network device is a received signal strength indicator (RSSI); or, the network device configures a signal type of the measurement signal as an inter user equipment cross link interference reference signal (UE-CLI-RS), and the measurement type configured by the network device includes at least one of: reference signal received power (RSRP), reference signal received quality (RSRQ), signal-to-interference plus noise ratio (SINR), or a received signal strength indicator (RSSI).

According to the interference measurement apparatus of the embodiments of the present disclosure, by receiving the measurement signal through the receiving beam, the interference measurement result of the measurement signal can be determined, so that the first terminal device can determine the second terminal device having mutual interference with the first terminal device, which is convenient for the network device to schedule, and data receiving performed by the first terminal device and data sending performed by the second terminal device are avoided to be performed at same frequency and same time, thereby improving data transmission efficiency and accuracy.

Corresponding to the interference measurement method provided in the embodiments of FIGS. 3 and 4, the present disclosure further provides an interference measurement apparatus. Since the interference measurement apparatus provided by the embodiments of the present disclosure corresponds to the interference measurement method provided in the embodiments of FIGS. 3 and 4, the implementations of the interference measurement method can also be adapted to the interference measurement apparatus provided by the embodiment of the present disclosure, which will not be described in detail in the embodiments of the present disclosure.

Figure 9:
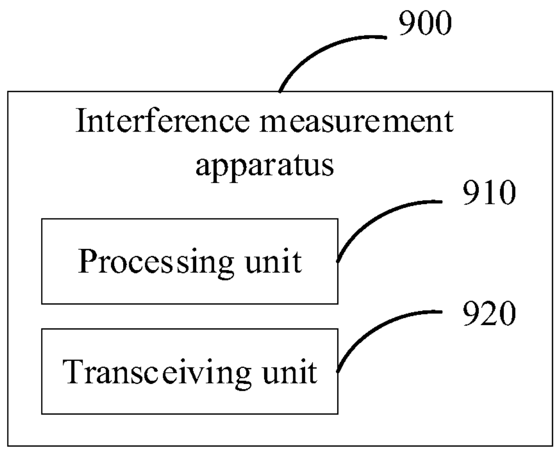
FIG. 9 is a schematic structural diagram of another interference measurement apparatus provided by an embodiment of the present disclosure.

FIG. 9 is a schematic structural diagram of an interference measurement apparatus provided by an embodiment of the present disclosure.

As shown in FIG. 9, the interference measurement apparatus 900 includes: a processing unit 910 and a transceiving unit 920.

The processing unit 910 is configured to generate a measurement signal; and the transceiving unit 920 is configured to send the measurement signal by using a sending beam in a sending beam set.

As an implementation of an embodiment of the present disclosure, the processing unit 910 is specifically configured to perform operations including: generating the measurement signal with a signal type of an inter user equipment cross link interference reference signal (UE-CLI-RS) according to a terminal device identifier of the second terminal device, where a network device configures the signal type of the measurement signal as the UE-CLI-RS; or, generating the measurement signal with any signal type, where a network device does not configure the signal type of the measurement signal.

As an implementation of an embodiment of the present disclosure, the sending beam set is determined by: determining, according to a reference synchronization signal block (SSB) configured by a network device, a receiving beam for receiving the reference SSB; or, determining, according to a channel state information reference signal (CSI-RS) configured by a network device, a receiving beam of the CSI-RS; and generating the sending beam set according to a sending beam corresponding to the receiving beam.

According to the interference measurement apparatus of the embodiments of the present disclosure, the measurement signal can be generated according to the signal type configured by the network device; the measurement signal is sent by using the sending beam in the sending beam set configured by the network device, and the method causes the second terminal device to send the signal by using the sending beam in the sending beam set configured by the network device, which improves data transmission quality, and the measurement signal can be flexibly generated according to the signal type configured by the network device, which reduces system cost, and the measurement signal is sent to the first terminal device, and after receiving the measurement signal, the first terminal device can determine the second terminal device having mutual interference to the first terminal device according to the measurement signal, which is convenient for the network device to schedule, and data receiving performed by the first terminal device and data sending performed by the second device are avoided to be performed at same frequency and same time, thereby improving data transmission efficiency and accuracy.

Corresponding to the interference measurement method provided in the embodiments of FIGS. 5 and 6, the present disclosure further provides an interference measurement apparatus. Since the interference measurement apparatus provided by the embodiments of the present disclosure corresponds to the interference measurement method provided in the embodiments of FIGS. 5 and 6, the implementations of the interference measurement method can also be adapted to the interference measurement apparatus provided by the embodiment of the present disclosure, which will not be described in detail in the embodiments of the present disclosure.

Figure 10:
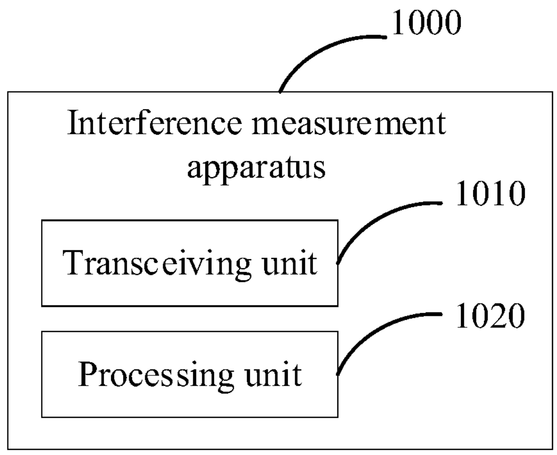
FIG. 10 is a schematic structural diagram of an interference measurement apparatus provided by an embodiment of the present disclosure.

FIG. 10 is a schematic structural diagram of an interference measurement apparatus provided by an embodiment of the present disclosure.

As shown in FIG. 10, the interference measurement apparatus 1000 includes: a transceiving unit 1010.

The transceiving unit 1010 is configured to receive reporting data sent by a first terminal device; where the reporting data includes: measurement data and a receiving time period of a measurement signal, where the measurement signal is received by the first terminal device by using a receiving beam of a physical downlink shared channel (PDSCH) from a second terminal device, the measurement data corresponding to a measurement type of the measurement signal is greater than or equal to a measurement threshold corresponding to the measurement type.

As an implementation of an embodiment of the present disclosure, the apparatus 1000 further includes: a processing unit 1020, configured to perform operations including: configuring a sending beam set for sending the measurement signal for the second terminal device; or, configuring a sending beam set for sending the measurement signal and a signal type of the measurement signal for the second terminal device.

As an implementation of an embodiment of the present disclosure, configuring a sending beam set includes: configuring a reference synchronization signal block (SSB), so as to determine the sending beam set according to a sending beam corresponding to a receiving beam of the reference SSB; or, configuring a channel state information reference signal (CSI-RS), so as to determine the sending beam set according to a sending beam corresponding to a receiving beam of the CSI-RS.

As an implementation of an embodiment of the present disclosure, the processing unit 1020 is further configured to perform operations including: configuring the measurement type and the measurement threshold of the measurement signal for receiving the first terminal device; or, configuring the measurement type, the measurement threshold and the signal type for receiving the measurement signal of the first terminal device.

As an implementation of an embodiment of the present disclosure, the processing unit 1020 is specifically configured to perform operations including: when a signal type of the measurement signal is not configured, configuring the measurement type as a received signal strength indication (RSSI), and configuring the measurement threshold corresponding to the measurement type; or, when a signal type of the measurement signal is configured as an inter user equipment cross link interference reference signal (UE-CLI-RS), configuring the measurement type including at least one of: reference signal received power (RSRP), reference signal received quality (RSRQ), signal-to-interference plus noise ratio (SINR), or a received signal strength indicator (RSSI), and configuring the measurement threshold corresponding to the measurement type.

According to the interference measurement apparatus of the embodiments of the present disclosure, the measurement data and the receiving time period of the measurement signal sent by the first terminal device are received, where the measurement signal belongs to to-be-reported interference signals of the first terminal device, and the measurement data is measurement data of the measurement signal received by the first terminal device from the second terminal device. Further, the scheduling strategy of the first terminal device and the second terminal device can be determined according to the measurement data. According to the method, after receiving the measurement signal, the first terminal device can determine the second terminal device having mutual interference with the first terminal device according to the measurement signal, and report the measurement data and the receiving time period to the network device, which is convenient for the network device to schedule, and data receiving performed by the first terminal device and data sending performed by the second terminal device are avoided to be performed at same frequency and same time, thereby improving data transmission efficiency and accuracy.

In order to realize the above embodiments, an embodiment of the present disclosure also provides another interference measurement device, which includes a processor and a memory, where a computer program is stored in the memory, and the processor executes the computer program stored in the memory, so that the device executes the method according to the embodiments of FIGS. 1 and 2; or, the method according to the embodiments of FIGS. 3 and 4.

In order to realize the above embodiments, an embodiment of the present disclosure also provides another interference measurement device, which includes a processor and a memory, where a computer program is stored in the memory, and the processor executes the computer program stored in the memory, so that the device executes the method according to the embodiments of FIGS. 5 and 6.

In order to realize the above embodiments, an embodiment of the present disclosure also provides another interference measurement device, which includes a processor and an interface circuit, where the interface circuit is configured to receive a code instruction and transmit the code instruction to the processor; and the processor is configured to execute the code instruction so as to perform the method according to the embodiments of FIGS. 1 and 2; or the method according to the embodiments of FIGS. 3 and 4.

In order to realize the above embodiments, an embodiment of the present disclosure also provides another interference measurement device, which includes a processor and an interface circuit, where the interface circuit is configured to receive a code instruction and transmit the code instruction to the processor; and the processor is configured to execute the code instruction so as to perform the method according to the embodiments of FIGS. 5 and 6.

In order to realize the above embodiments, an embodiment of the present disclosure also provides a computer-readable storage medium, configured to store an instruction, where when the instruction is executed, the method according to the embodiments of FIGS. 1 and 2 is implemented; or, the method according to the embodiments of FIGS. 3 and 4 are implemented.

In order to realize the above embodiments, an embodiment of the present disclosure also provides a computer-readable storage medium, configured to store an instruction, where when the instruction is executed, the method according to the embodiments of FIGS. 5 and 6 are implemented.

In order to realize the above embodiments, an embodiment of the present disclosure also provides a computer program product, and when the computer program product is running on a computer, the computer is caused to perform the method according to the embodiments of FIGS. 1 and 2, or the method according to the embodiments of FIGS. 3 and 4.

In order to realize the above embodiments, an embodiment of the present disclosure also provides a computer program product, and when the computer program product is running on a computer, the computer is caused to perform the method according to the embodiments of FIGS. 5 and 6.

Figure 11:
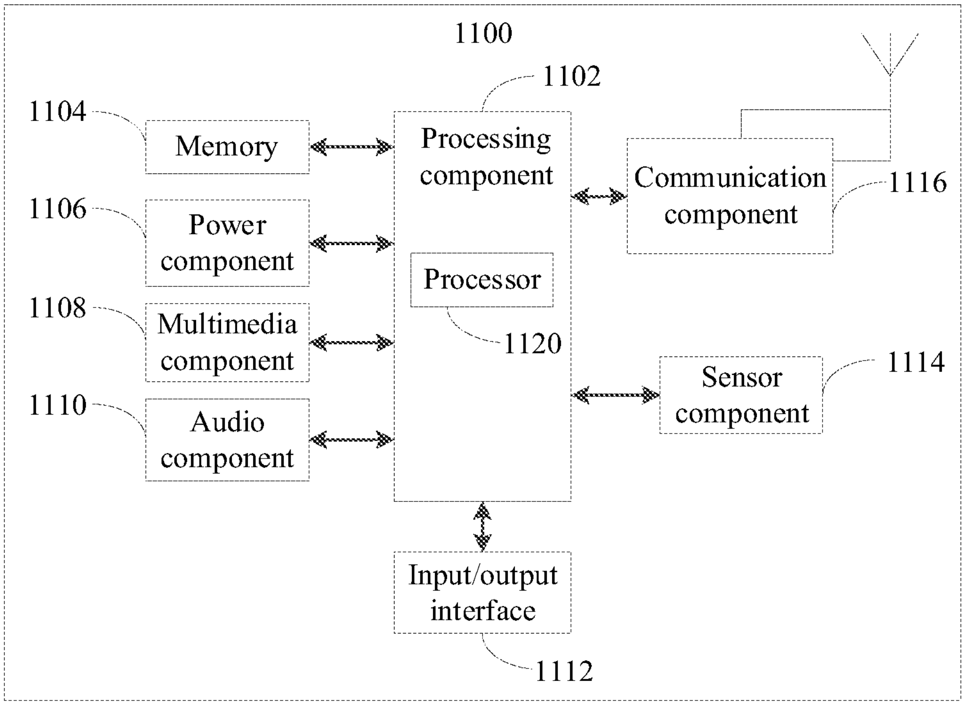
FIG. 11 is a block diagram of a user terminal provided by an embodiment of the present disclosure.

FIG. 11 is a block diagram of a UE 1100 provided by an embodiment of the present disclosure. For example, the UE 1100 may be a mobile phone, a computer, a digital broadcast user device, a messaging device, a game console, a tablet device, a medical device, a fitness device, a personal digital assistant, and the like.

Referring to FIG. 11, the UE 1100 may include at least one of the following components: a processing component 1102, a memory 1104, a power component 1106, a multimedia component 1108, an audio component 1110, an input/output (I/O) interface 1112, a sensor component 1114, or a communication component 1116.

The processing component 1102 generally controls overall operations of the UE 1100, such as operations associated with display, telephone call, data communication, camera operation and recording operation. The processing component 1102 may include at least one processor 1120 to execute instructions to complete all or part of steps of the method described above. In addition, the processing component 1102 can include at least one module to facilitate interaction between the processing component 1102 and other components. For example, the processing component 1102 can include a multimedia module to facilitate interaction between the multimedia component 1108 and the processing component 1102.

The memory 1104 is configured to store various types of data to support operations at the UE 1100. Examples of these data include instructions for any application or method operating on the UE 1100, contact data, phone book data, messages, pictures, videos, and the like. The memory 1104 can be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 1106 provides power to various components of the UE 1100. The power component 1106 may include a power management system, at least one power supply, and other components associated with generating, managing and distributing power for the UE 1100.

The multimedia component 1108 includes a screen providing an output interface between the UE 1100 and the user. In some embodiments, the screen may include a liquid crystal display (LCD) and a touch panel (TP). If the screen includes a touch panel, the screen may be implemented as a touch screen to receive an input signal from a user. The touch panel includes at least one touch sensor to sense touch, sliding and gestures on the touch panel. The touch sensor may not only sense the boundary of a touch or sliding action, but also detect a wake-up time and pressure related to the touch or sliding operation. In some embodiments, the multimedia component 1108 includes a front camera and/or a rear camera. When the UE 1100 is in an operation mode, such as a shooting mode or a video mode, the front camera and/or the rear camera can receive external multimedia data. Each front camera and rear camera can be a fixed optimal lens system or have focal length and optimal zoom capability.

The audio component 1110 is configured to output and/or input audio signals. For example, the audio component 1110 includes a microphone (MIC) configured to receive external audio signals when the UE 1100 is in operation modes, such as a call mode, a recording mode and a voice recognition mode. The received audio signal may be further stored in the memory 1104 or transmitted via the communication component 1116. In some embodiments, the audio component 1110 further includes a speaker for outputting audio signals.

I/O interface 1112 provides an interface between processing component 1102 and peripheral interface modules, which can be keyboards, click-wheels, buttons, etc. These buttons may include, but are not limited to, home button, volume button, start button and lock button.

The sensor component 1114 includes at least one sensor for providing various aspects of state evaluation for the UE 1100. For example, the sensor component 1114 can detect an ON/OFF state of the UE 1100, the relative positioning of components, such as the display and keypad of the UE 1100, the position change of the UE 1100 or a component of the UE 1100, the presence or absence of user contact with the UE 1100, the orientation or acceleration/deceleration of the UE 1100 and the temperature change of the UE 1100. The sensor component 1114 may include a proximity sensor configured to detect the presence of a nearby object without any physical contact. The sensor component 1114 may also include an optical sensor, such as a CMOS or CCD image sensor, for use in imaging applications. In some embodiments, the sensor component 1114 may further include an acceleration sensor, a gyro sensor, a magnetic sensor, a pressure sensor or a temperature sensor.

The communication component 1116 is configured to facilitate wired or wireless communication between the UE 1100 and other devices. The UE 1100 can access a wireless network based on communication standards, such as WiFi, 2G or 3G, or a combination thereof. In an exemplary embodiment, the communication component 1116 receives a broadcast signal or broadcast related information from an external broadcast management system via a broadcast channel. In an exemplary embodiment, the communication component 1116 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the UE 1100 can be realized by at least one application specific integrated circuit (ASIC), a digital signal processor (DSP), a digital signal processing device (DSPD), a programmable logic device (PLD), a field programmable gate array (FPGA), a controller, a micro-controller, a microprocessor or other electronic components, and is used for executing the method according to any one of the above embodiments.

In an exemplary embodiment, there is also provided a non-transitory computer-readable storage medium including instructions, such as the memory 1104 including instructions, which can be executed by the processor 1120 of the UE 1100 to complete the above method. For example, the non-transitory computer-readable storage medium can be ROM, random access memory (RAM), CD-ROM, magnetic tape, floppy disk, optical data storage device, etc.

Figure 12:
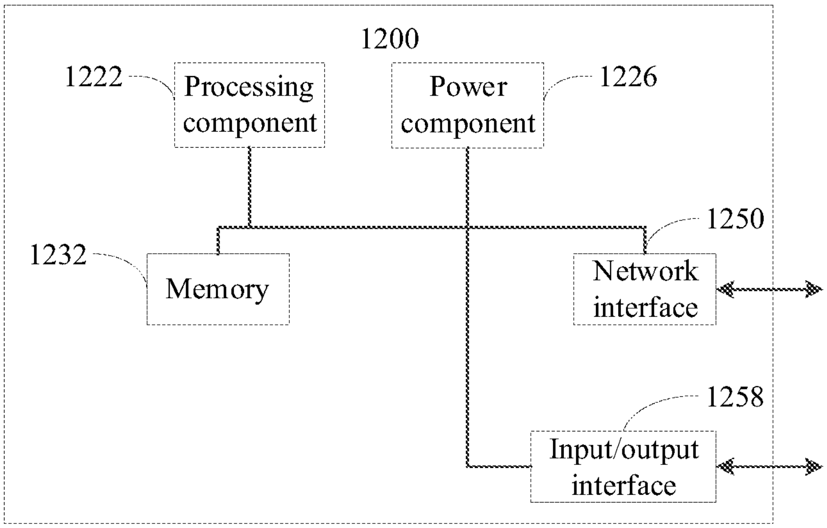
FIG. 12 is a schematic structural diagram of a network device provided by an embodiment of the present disclosure.

As shown in FIG. 12, FIG. 12 is a schematic structural diagram of a network device provided by an embodiment of the present disclosure. Referring to FIG. 12, the network device 1200 includes a processing component 1222, which further includes at least one processor, and memory resources represented by a memory 1232 for storing instructions (such as application programs) executable by the processing component 1222. The application program stored in the memory 1232 may include one or more modules each corresponding to a set of instructions. In addition, the processing component 1222 is configured to execute instructions to perform any of the aforementioned methods applied to the base station, for example, the method of any one of FIGS. 5 to 6.

The network device 1200 may further include a power component 1226 configured to perform power management of the network device 1200, a wired or wireless network interface 1250 configured to connect the network device 1200 to a network, and an input/output (I/O) interface 1258. The network device 1200 can operate based on an operating system stored in the memory 1232, such as Windows Server™, Mac OS X™, Unix™, Linux™, FreeBSD™ or the like.

Those of ordinary skills in the art will easily think of other embodiments of the present disclosure after considering the specification and practicing the disclosure disclosed herein. The present disclosure is intended to cover any variation, use or adaptation of the present disclosure, which follows the general principles of the present disclosure and includes common sense or common technical means in the technical field not disclosed in this disclosure. The specification and examples are to be regarded as exemplary only, with the true scope and spirit of the disclosure being indicated by the following claims.

It should be understood that the present disclosure is not limited to the precise structure described above and shown in the drawings, and various modifications and changes can be made without departing from its scope. The scope of the present disclosure is limited only by the appended claims.

In order to realize the above embodiments, an embodiment of the present disclosure also provides a communication apparatus, which can be a network device, a terminal device, a chip, a chip system, or a processor that supports the network device to realize the above method, or a chip, a chip system, or a processor that supports the terminal device to realize the above method. The apparatus can be used to realize the method described in any of the above-mentioned method embodiments, for details, please refer to the description in the above-mentioned method embodiments.

The communication apparatus may include one or more processors. The processor can be a general-purpose processor or a special-purpose processor, etc. For example, a baseband processor or a central processor. The baseband processor can be used to process communication protocols and communication data, and the central processor can be used to control communication apparatuses (such as base stations, baseband chips, terminal equipment, terminal equipment chips, DU or CU, etc.), execute computer programs, and process data of computer programs.

Optionally, the communication apparatus may further include one or more memories, on which a computer program may be stored, and the processor executes the computer program, so that the communication device can execute the method described in the above method embodiments. Optionally, the memory can also store data. The communication device and the memory can be set separately or integrated together.

Optionally, the communication apparatus may also include a transceiver and an antenna. The transceiver can be referred to as a transceiver unit, a transceiver, or transceiver circuit, etc., which is used to realize transceiver functions. The transceiver may include a receiver and a transmitter, and the receiver may be referred to as a receiver or a receiving circuit, etc., for realizing the receiving functions; the transmitter can be referred to as a transmitter or a transmitting circuit, etc., and is used to realize the transmitting functions.

Optionally, the communication apparatus may also include one or more interface circuits. The interface circuit is used to receive code instructions and transmit them to the processor. The processor executes the code instructions to cause the communication device to perform the method described in any of the above method embodiments.

In an implementation, the processor may include a transceiver for receiving and transmitting functions. For example, the transceiver can be a transceiver circuit, or an interface, or an interface circuit. Transceiver circuits, interfaces or interface circuits for receiving and transmitting functions can be separated or integrated. The transceiver circuits, interfaces or interface circuits can be used for reading and writing codes/data, or the transceiver circuits, interfaces or interface circuits can be used for signal transmission or transmission.

In an implementation, the processor can store a computer program, and the computer program running on the processor can cause the communication apparatus to perform the method described in any of the above method embodiments. A computer program may be solidified in a processor, in which case the processor may be implemented by hardware.

In an implementation, the communication apparatus may include a circuit, which can realize functions of sending or receiving or communicating in the aforementioned method embodiments. The processor and transceiver described in the present disclosure can be implemented on integrated circuit (IC), analog IC, radio frequency integrated circuit (RFIC), mixed-signal IC, application specific integrated circuit (ASIC), printed circuit board (PCB), electronic device, etc. The processor and transceiver can also be manufactured by various IC process technologies, such as CMOS (complementary metal oxide semiconductor), NMOS (NMOS-oxide-semiconductor, N-type metal oxide semiconductor), PMOS (positive channel metal oxide semiconductor), BJT (Bipolar Junction Transistor), bipolar CMOS (BiCMOS), silicon germanium (SiGe), gallium arsenide (GaAs), etc.

The communication apparatus described in the above embodiments may be a network device or a terminal device, but the scope of the communication apparatus described in the present disclosure is not limited to this. The communication apparatus may be a stand-alone device or may be part of a larger device. For example, the communication apparatus may be:

(1) independent integrated circuit (IC), or chip, or chip system or sub-system;
(2) a set having one or more ICs, and optionally, the IC set may also include a storage unit for storing data and computer programs;
(3) ASIC, such as a modem;
(4) modules that can be embedded in other devices;
(5) receiver, terminal device, intelligent terminal device, cellular phone, wireless device, handset, mobile unit, vehicle-mounted device, network device, cloud device, artificial intelligence device, etc.;
(6) others, etc.

In the case that the communication apparatus can be a chip or a chip system, the chip can include a processor and an interface. A number of processors can be one or more, and a number of interfaces can be multiple.

Optionally, the chip also includes a memory for storing necessary computer programs and data.

Those skilled in the art can also understand that various illustrative logical block and step listed in the embodiments of the present disclosure can be implemented by electronic hardware, computer software, or a combination of both. Whether this function is realized by hardware or software depends on the specific application and the design requirements of the whole system. Those skilled in the art can use various methods to realize the described functions for each specific application, but this realization should not be understood as beyond the scope of protection of the embodiments of the present disclosure.

Those of ordinary skills in the art will easily think of other embodiments of the present disclosure after considering the specification and practicing the disclosure disclosed herein. The present disclosure is intended to cover any variation, use or adaptation of the present disclosure, which follows the general principles of the present disclosure and includes common sense or common technical means in the technical field not disclosed in this disclosure. The specification and examples are to be regarded as exemplary only, with the true scope and spirit of the disclosure being indicated by the following claims.

It should be understood that steps can be reordered, added or deleted using the various forms of flow shown above. For example, the steps described in the embodiments of the present disclosure can be executed in parallel, sequentially or in a different order, so long as the desired result of the technical solution disclosed in the present disclosure can be achieved, there is no restriction here.

The above specific embodiments do not limit the scope of protection of the present disclosure. It should be understood by those skilled in the art that various modifications, combinations, sub-combinations and substitutions can be made according to design requirements and other factors. Any modification, equivalent substitution and improvement made within the spirit and principle of the present disclosure should be included in the protection scope of the disclosure.

It should be understood that the present disclosure is not limited to the precise structure described above and shown in the drawings, and various modifications and changes can be made without departing from its scope. The scope of the present disclosure is limited only by the appended claims.

The invention claimed is:

1. An interference measurement method, wherein the method is performed by a first terminal device, and the method comprises:
- receiving a measurement signal by using a receiving beam in a physical downlink shared channel (PDSCH) of the first terminal device; and
- determining an interference measurement result of the measurement signal;
- wherein the method further comprises:
- determining reporting data of the measurement signal, wherein the interference measurement result of the measurement signal is that the measurement signal belongs to to-be-reported interference signals; and
- sending the reporting data to a network device;
- wherein determining reporting data of the measurement signal comprises:
  - when a signal type of the measurement signal is configured by the network device as an inter user equipment cross link interference reference signal (UE-CLI-RS), parsing the measurement signal to acquire a terminal device identifier; and generating the reporting data according to the terminal device identifier, a receiving time period of the measurement signal and measurement data;
  - and,
  - when the network device does not configure the signal type of the measurement signal, generating the reporting data according to the receiving time period of the measurement signal and the measurement data.

2. The method according to claim 1, wherein determining an interference measurement result of the measurement signal comprises:
- determining, according to a measurement type configured by a network device, a measurement manner corresponding to the measurement type;
- performing channel quality measurement on the measurement signal according to the measurement manner to determine the measurement data corresponding to the measurement type; and
- determining the interference measurement result according to the measurement data and a measurement threshold corresponding to the measurement type configured by the network device.

3. The method according to claim 2, wherein determining the interference measurement result according to the measurement data and the measurement threshold corresponding to the measurement type configured by the network device comprises:

determining that the measurement signal belongs to to-be-reported interference signals, wherein the measurement data is greater than or equal to the measurement threshold; and determining that the measurement signal does not belong to to-be-reported interference signals, wherein the measurement data is less than the measurement threshold.

4. The method according to claim 1, wherein a channel for sending the reporting data is a physical uplink shared channel (PUSCH) or a physical uplink control channel (PUCCH).

5. The method according to claim 2, wherein when the network device does not configure the signal type of the measurement signal, the measurement type configured by the network device is a received signal strength indicator (RSSI);

or, the network device configures the signal type of the measurement signal as an inter user equipment cross link interference reference signal (UE-CLI-RS), and the measurement type configured by the network device comprises at least one of: reference signal received power (RSRP), reference signal received quality (RSRQ), signal-to-interference plus noise ratio (SINR), or a received signal strength indicator (RSSI).

6. An interference measurement method, wherein the method is performed by a second terminal device, and the method comprises:

generating a measurement signal; and sending the measurement signal by using a sending beam in a sending beam set;

wherein generating the measurement signal comprises:

when a network device configures a signal type of the measurement signal as an inter user equipment cross link interference reference signal (UE-CLI-RS), generating the measurement signal with the signal type of the UE-CLI-RS according to a terminal device identifier of the second terminal device, wherein the terminal device identifier, a receiving time period of the measurement signal and measurement data are used to generate reporting data;

and, when the network device does not configure the signal type of the measurement signal, generating the measurement signal with any signal type, wherein the receiving time period of the measurement signal and the measurement data are used to generate reporting data.

7. The method according to claim 6, wherein the sending beam set is determined by:

determining, according to a reference synchronization signal block (SSB) configured by a network device, a receiving beam for receiving the reference SSB; or, determining, according to a channel state information reference signal (CSI-RS) configured by a network device, a receiving beam of the CSI-RS; and generating the sending beam set according to a sending beam corresponding to the receiving beam.

8. An interference measurement method, wherein the method is performed by a network device, and the method comprises:

receiving reporting data sent by a first terminal device; wherein the reporting data comprises: measurement data and a receiving time period of a measurement signal, wherein the measurement signal is received by the first terminal device by using a receiving beam of a physical downlink shared channel (PDSCH) from a second terminal device, the measurement data corresponding to a measurement type of the measurement signal is greater than or equal to a measurement threshold corresponding to the measurement type;

wherein when a signal type of the measurement signal is configured as an inter user equipment cross link interference reference signal (UE-CLI-RS), the reporting data is generated according to a terminal device identifier, the receiving time period of the measurement signal and the measurement data, wherein the terminal device identifier is obtained by parsing the measurement signal;

and, when the signal type of the measurement signal is not configured, the reporting data is generated according to the receiving time period of the measurement signal and the measurement data.

9. The method according to claim 8, wherein the method further comprises:

configuring a sending beam set for sending the measurement signal for the second terminal device;

or, configuring a sending beam set for sending the measurement signal for the second terminal device, and the signal type of the measurement signal.

10. The method according to claim 9, wherein configuring the sending beam set comprises:

configuring a reference synchronization signal block (SSB), so as to determine the sending beam set according to a sending beam corresponding to a receiving beam of the reference SSB;

or, configuring a channel state information reference signal (CSI-RS), so as to determine the sending beam set according to a sending beam corresponding to a receiving beam of the CSI-RS.

11. The method according to claim 8, wherein the method further comprises:

configuring the measurement type and the measurement threshold of the measurement signal of the first terminal device;

or, configuring the measurement type, the measurement threshold and the signal type of the measurement signal of the first terminal device.

12. The method according to claim 8, wherein when the signal type of the measurement signal is not configured, the method comprises:

configuring the measurement type as a received signal strength indication (RSSI), and configuring the measurement threshold corresponding to the measurement type;

or, when the signal type of the measurement signal is configured as the UE-CLI-RS, the method comprises: configuring the measurement type comprising at least one of: reference signal received power (RSRP), reference signal received quality (RSRQ), signal-to-interference plus noise ratio (SINR), or a received signal strength indicator (RSSI), and configuring the measurement corresponding to the measurement type.

13. An interference measurement device, comprising: a processor and a memory, wherein the memory stores a computer program, and the processor executes the computer program stored in the memory so as to cause the device to perform the method according to claim 1.

14. An interference measurement device, comprising: a processor and a memory, wherein the memory stores a computer program, and the processor executes the computer program stored in the memory so as to cause the device to perform the method according to claim 8.

15. A non-transitory computer-readable storage medium, configured to store an instruction, wherein when the instruction is executed, the method according to claim 1 is implemented.

16. A non-transitory computer-readable storage medium, configured to store an instruction, wherein when the instruction is executed, the method according to claim 8 is implemented.

17. An interference measurement device, comprising: a processor and a memory, wherein the memory stores a computer program, and the processor executes the computer program stored in the memory so as to cause the device to perform the method according to claim 6.

* * * * *